Patented Feb. 1, 1949

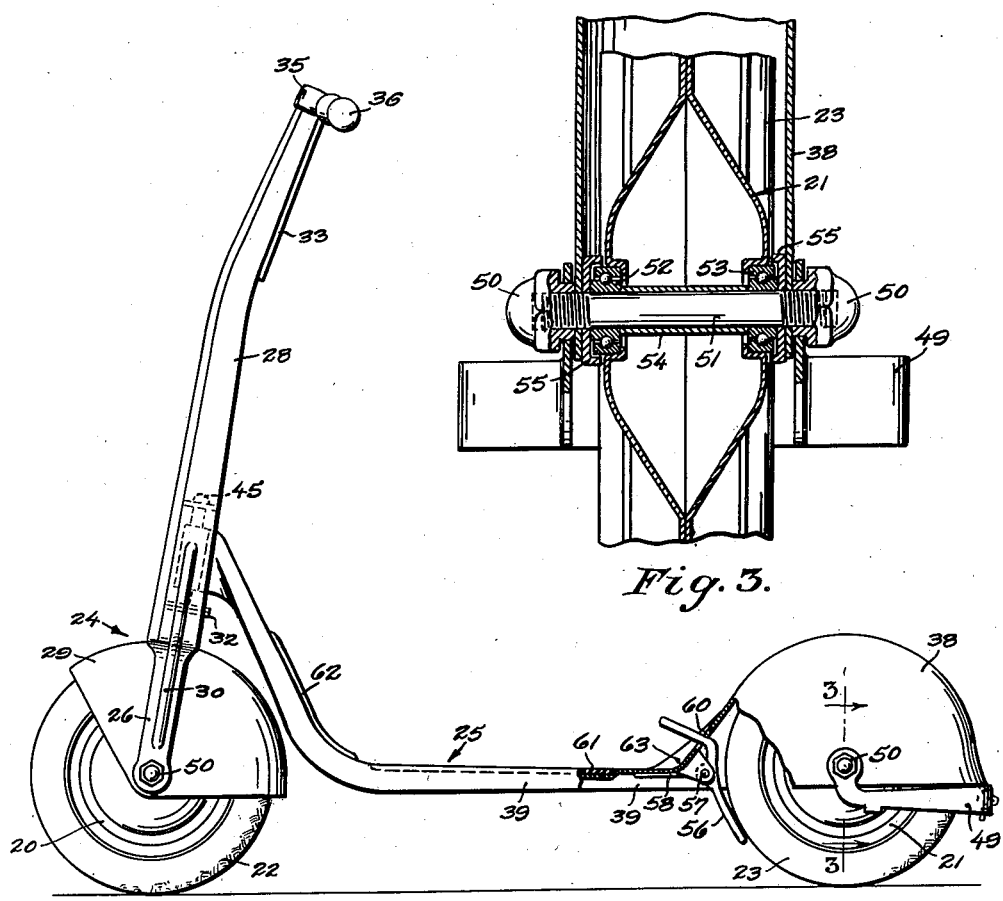
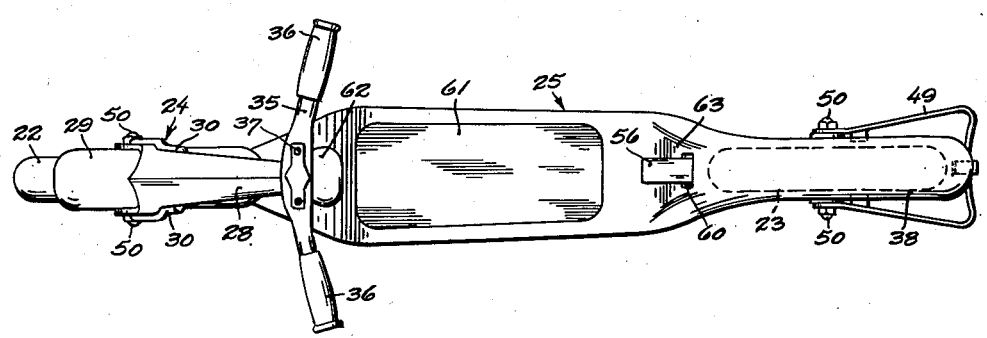

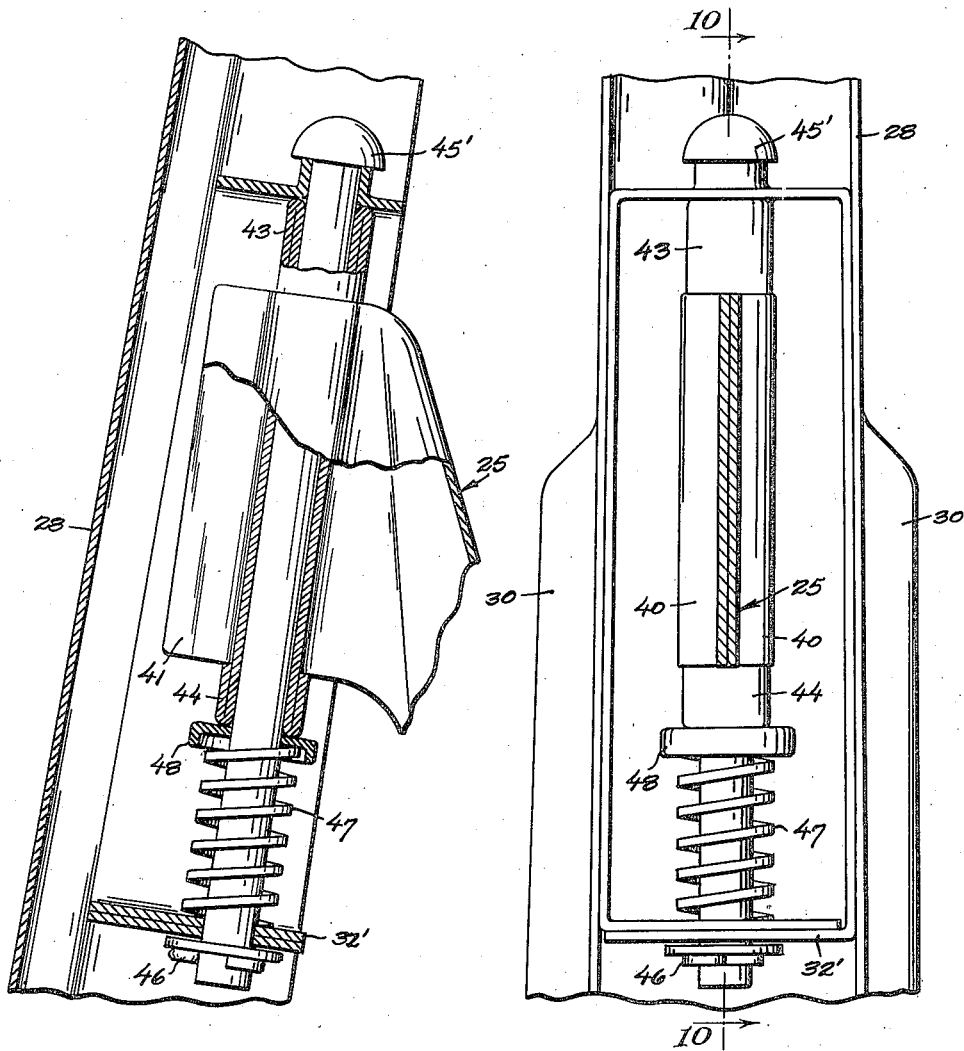

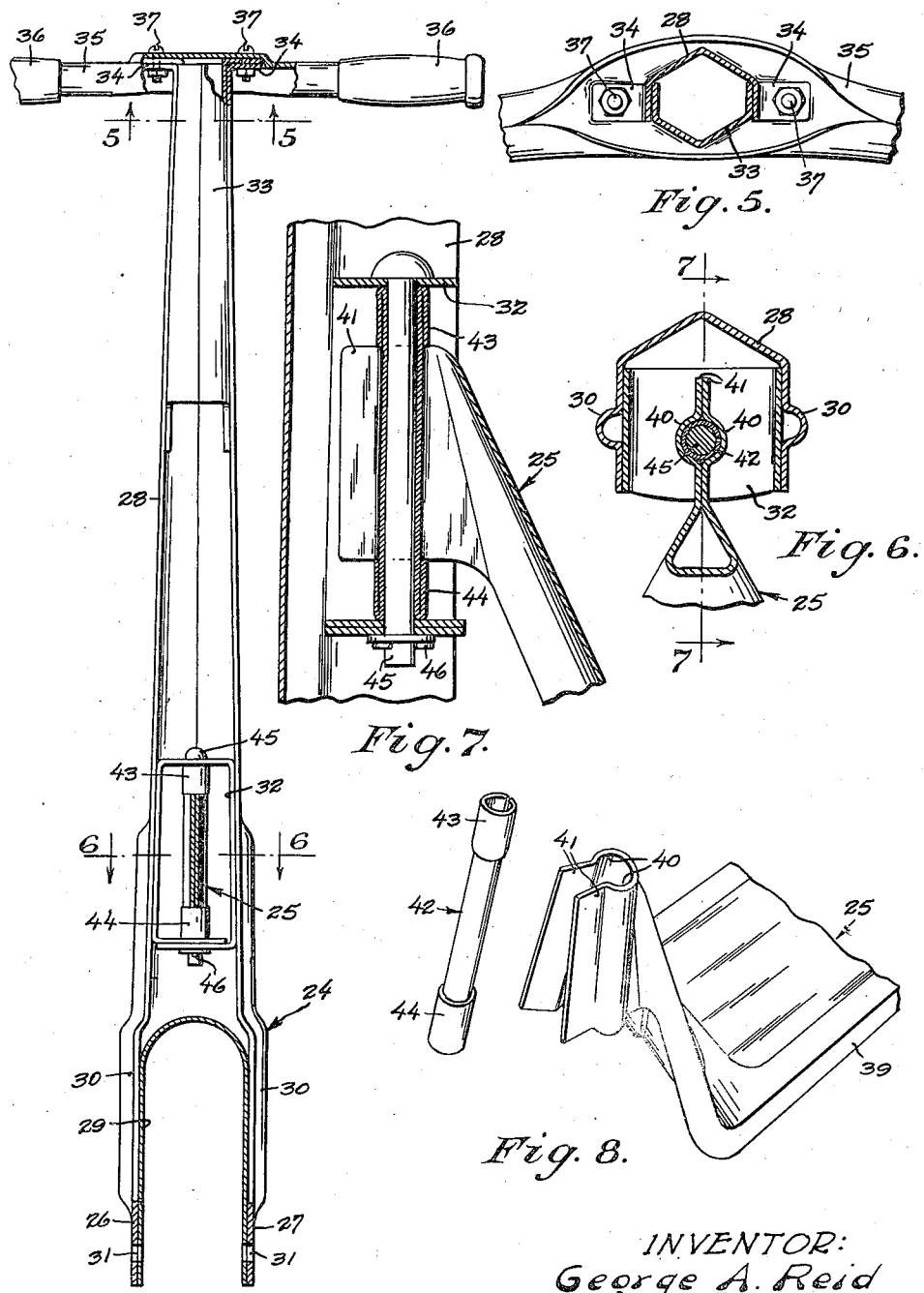

2,460,395

UNITED STATES PATENT OFFICE 2,460,395

CHILD'S SCOOTER

George A. Reid, Seattle, Wash., assignor to Northwest Metal Products, Inc., Seattle, Wash., a corporation of Washington Application April 27, 1946, Serial No. 665,573

11 Claims. (Cl. 280—87.04)

This invention relates to a child's scooter, and as one of its principal objects aims to provide a vehicle of this character engineered with full-skirted front and rear fenders and otherwise such that the same follows the general lines of a motor-driven scooter much more closely than the conventional child's scooter, and thus has a greater appeal for the youngster than scooters heretofore devised.

It is a further and important object to devise a child's scooter which is unusually sturdy.

It is a still further object of the invention to provide an all-steel child's scooter in which the full-skirted rear fender and the frame proper are produced as a one-piece stamping.

The invention has the still further and particular object of producing a child's scooter in which the full-skirted front fender and the vehicle's fork are welded as an integral unit.

As a further object still, the invention aims to provide a child's scooter in which welding is resorted to as a means of rigidly connecting all fixed parts, excepting only the handle-bars which desirably are boltably attached to permit removal.

It is a still further and particular object to so attach the handle-bars to the vehicle's fork as to free the connecting bolts from any sheer stress.

The invention has the yet further and important object of devising an improved suspension between the forward end of the frame and the swivel-mounted fork.

With these foregoing and certain other objects and advantages in view and which will appear and be understood in the course of the following description and claims, the invention consists in the novel construction and in the adaptation and combination of parts hereinafter described and claimed.

In the drawings:

Figure 1 is a view in side elevation, with parts broken away and shown in section to illustrate a child's scooter constructed in accordance with the present invention.

Fig. 2 is a top plan view thereof.

Fig. 3 is a fragmentary transverse vertical section taken to an enlarged scale on line 3—3 of Fig. 1.

Fig. 4 is a transverse vertical sectional view taken through the front fender and the frame on a line immediately to the rear of the fork and looking in a forward direction to illustrate the form in rear elevation, the scale being enlarged and the front wheel and its axle being deleted.

Figs. 5 and 6 are fragmentary horizontal sectional views on line 5—5 and 6—6 respectively of Fig. 4 and employing a scale enlarged from that of the latter view.

Fig. 7 is a longitudinal vertical section on line 7—7 of Fig. 6.

Fig. 8 is a perspective view portraying the front end of the frame together with a bushing arranged to be carried thereby and showing the two parts preliminary to the constructional step of inserting the bushing within an eye-forming crotch of the frame.

Fig. 9 is a fragmentary transverse vertical section taken on a line which would correspond to that of Fig. 4 and illustrating a preferred front end mounting introducing a spring suspension; and Fig. 10 is a longitudinal vertical section on line 10—10 of Fig. 9.

The present invention provides double-disk front and rear wheels designated by the numerals 20 and 21, respectively, fitted in each instance with a pneumatic tire, as 22 and 23, and employs a vehicle-body assembly comprised of a fork and a frame designated generally by 24 and 25, respectively. The term "fork" comprehends the two wheel-straddling yoke-arms 26—27 and a stem 28 arising therefrom.

According to the present invention, my said fork is produced from sheet steel, with the stem being sectionally of a general U-form from which the fork-arms extend downwardly as prolongations of the side walls or cheeks of the stem. The back wall of the stem, considered in horizontal section, is desirably of a V-shape, and at the base of this wall there is provided a re-entrant cut arranged to find a snug fit over the crowned back of a full-skirted fender 29 introduced between the fork-arms, this fender being secured by spot welding to form an integral part of the fork. The fork-arms are slightly offset beyond the cheek walls of the stem and for a distance above and below the juncture the sheet steel comprising the fork is pressed outwardly to provide, at each side of the fork, a reinforcing rib 30. For the reception of an axle assembly, hereinafter described, the fork-arms and skirts of the fender are apertured as at 31 (Fig. 4).

Above the crown of the introduced fender, there is inserted between the cheek walls of the stem a bracket 32, and this bracket serves as a journal mounting for a swivel pin, which will be hereinafter referred to in the course of describing the scooter's front end suspension. This bracket is comprised of a strip of sheet steel bent on transverse lines at intervals of the length to form a rectangular figure having the ends overlapped. Spot-welding is employed to join these ends and to secure the bracket in place, and there are provided through the top and bottom walls of this bracket aligned apertures accommodating the pin.

The stem has its upper part stiffened by a second piece of sheet steel denoted 33, and this stiffened piece in point of its sectional configuration is quite similar to the shape of the stem principal, the stiffening piece being placed in opposing relation to the stem principal, with the cheek walls of the former juxtaposed within the cheek walls of the latter, spot-welding being here again employed to integrate the two. Sectionally considered, the resulting tube-like upper portion is hexagonal in form. At the head end of the structure, the stem principal and the applied stiffener each present tab-like elements projecting as longitudinal prolongations of the respective cheek walls, and these tabs, which overlie one another, are directed outwardly as two-thickness ears from opposite sides of the stem. These ears are denoted 34. Fitting over the stem and presenting a socket in its under side into which the ears find a close-fitting engagement is a handle-bar 35, and fitting over the tubular ends of this handle-bar are rubber grips 36. The handle-bar is secured to the two-thickness ears by bolt-and-nut assemblies 37.

As with the described fork, its handle-bar, and the front fender 29, which becomes an integral part of the work, the frame of the scooter is pressed from sheet steel, and an important characteristic of the frame is the fact of its being drawn from a single piece of sheet steel to include the frame proper and a rear fender 38, and with the latter being of a full-skirted type depending by its lower margin below the axial line of the rear wheel. Aligned apertures are provided through these skirts for reception of the axle bolt which carries said wheel.

The frame is goose-necked at the forward end in the manner customary to scooters, and there is provided along each side of the frame a depending flange 39 which runs coextensive of the length. Said flange, in more particularity, extends forwardly as a prolongation of the fender skirts, and at the front or head end of the goose-neck, and whereat the frame tapers inwardly when viewed in top plan, the two flanges extend as terminal leaves, these leaves being somewhat greater in depth than their flange principals and being each formed with a half-circle vertical groove 40 beyond which the material projects forwardly as a flat wing 4. These two half-circle grooves are disposed to register, and by the act of drawing the plane wing extremities into juxtaposition and spot-welding, there is provided a bearing accommodating the reception of a bushing, and this bushing, denoted 42, is desirably produced from a strip of sheet steel. The production procedure is one in which the ends are first rolled back, and the body then turned about a shaping mandrel, with a weld seam being applied to join the abutting edges. The central part of the produced bushing corresponds in point of its diameter and length to the diameter and length of the bearing formed by joining the vertically-grooved terminal leaves of the frame, and the rolled ends, designated 43 and 44, consequently abut top and bottom against the bearing to lock the bushing in place. An inspection of Fig. 8 will give a clear understanding of the manner in which the bushing is inserted between said terminal leaves of the frame, drawing the two leaves one against the other, the welding step which is then resorted to in holding the wings 41 in juxtaposition serving to permanently secure the bushing in place.

In assembling the frame and fork, the frame-carried bushing is inserted in the bracket 32 to bring the bore of the bushing into axial alignment with the apertures of the bracket, and the swivel pin, denoted 45, is then inserted from above through the registering holes, and a cotter pin 46 is applied to the lower end. In the arrangement as shown in Figs. 1 through 7, inclusive, the opening between top and bottom walls of the bracket conforms to the length of the bushing, and the bracket thus holds the bushing against endwise movement. In Figs. 9 and 10 there is illustrated a modified front end mounting characterized in that the forward end of the frame is spring-suspended from the fork. This latter arrangement, and which I prefer and consequently incorporate in the production model of my scooter, employs a bracket 32' of somewhat greater overall height than the length of the bushing, and introduces a compression spring 47 between the base wall of the bracket and the lower end of the bushing, the spring bearing by its head end against a keeper 48, the swivel pin being in this instance denoted 45'.

Reverting to the rear fender of the scooter, there is provided a parking stand 49. There is nothing particularly unusual about this stand other than, perhaps, the manner of its support, such support and as distinguished from the axle proper being derived from journal hubs of cap nuts 50 which thread upon the opposite ends of an axle bolt 51 and bear by their hub faces against the fender skirts. The axle mounting employs ball bearings, as 52 and 53, the outer ring of one bearing seating in a cupped recess formed at the hub of one disk, and the outer ring of the other bearing seating in the cupped recess formed in the hub of the other disk of each wheel. Holding the inner rings of the two bearings apart is a spacer 54, and applied externally of the bearings are grease-retaining keepers 55 which are brought firmly to bear against said inner rings by pressure exerted upon the fender skirts from the cap nuts 50.

As a brake, the scooter employs a foot lever 56 fulcrumed as at 57 to a bracket 58 welded to the underside of the fender at the approximate point of juncture with the horizontal reach of the frame. The upper foot-engaging end of the lever projects through an opening 60 cut in the forward wall of the fender and occupies a more or less horizontal position exposed to the free or "scooter" foot of a child operating the vehicle. As a stand for the child's anchor foot, the horizontal reach of the frame presents a central depression accommodating a rubber mat 61 which is cemented in place. It will be noted that the frame, in addition to the reinforcement provided by the lateral flanges, is stiffened both at the front and rear ends of the frame's horizontal reach, the front stiffening being obtained by pressing a panel of the material upwardly as at 62 and the rear stiffening being accomplished by indenting the material, as at 63, at the juncture of the reach with the rear fender.

From the above detailed description of the invention, it is believed that the construction thereof will at once be apparent. No limitations are to be implied therefrom, it being my intention that all forms of construction and variations in detail coming within the scope of the hereto annexed claims are to be considered as comprehended by the invention.

What I claim, is:

1. The body structure for a child's scooter comprising a vehicle frame of all-metal construction presenting a foot-board and a full-skirted integral fender to the rear of the board with downturned flanges extending forwardly along both sides of the frame as prolongations of the lower margins of the fender skirts, and a fork swivel-mounted upon the forward end of the frame and having a full-skirted front fender received between and secured to the furcate arms of the fork, the metal of the frame being indented at the point juncture of the foot-board and the fender in a manner to leave gusset-like webs at each side of the indentation.

2. The frame-piece for a child's scooter comprising an all-metal member presenting a foot-board and having a full-skirted integral fender to the rear of the board formed with the latter as a unit stamping and with downturned flanges extending forwardly along both sides of the frame as prolongations of the lower margins of the fender skirts, the metal of the frame being indented at the point of juncture of the foot-board and the fender in a manner to leave gusset-like webs at each side of the indentation.

3. In a child's scooter employing a fork member, and having a pin and its complement in a bushing for swivel-connecting the fork to a frame-piece therefor, the frame-piece comprising a member of sheet-metal construction presenting a foot-board and an upturned neck at the forward end stiffened along each side by downturned flanges running coextensive of the length, said neck, considered in top plan, tapering inwardly toward the front and having the terminal ends of the flanges projecting forwardly in the nature of wings which are brought together and secured about the bushing to lock the bushing to the frame-piece.

4. The fork-piece for a child's scooter comprising a member of sheet-metal construction formed with fork arms at the bottom and having an integral stem rising therefrom with the stem being sectionally of a U-shaped configuration and having reinforcing continuous ribs pressed outwardly from the fork arms and from the flanking sides of the U-stem to span the shoulder which connects said fork arms with the stem, and having a full-skirted front fender received between and secured to the fork arms as an integral part of the fork-piece.

5. The fork-piece for a child's scooter which comprises an all-metal member formed with fork arms at the bottom and having a stem rising therefrom, said stem comprising a channel principal and an opposing channel stiffener having its flanking walls received between and welded to the flanking walls of the principal, said principal and its stiffener each providing tab-like elements projecting beyond the head end of the stem as longitudinal prolongations of the respective flanking walls and bent outwardly at substantial right angles to the walls to form two-thickness ears, said ears being vertically apertured, a handle-bar for the upper end of the stem formed in its underside with a socket closely fitting said ears, and nutted bolts securing the handle-bar to the ears.

6. The fork-piece for a child's scooter which comprises an all-metal member formed with fork arms at the bottom and having a stem rising therefrom, said stem comprising a channel principal stiffened by an opposingly disposed channel member having its flanking walls received between and welded to the flanking walls of the principal, the flanking walls of the principal and the flanking walls of the stiffener each providing tab-like prolongations projecting beyond the head end of the stem and bent over at right angles to the walls to form two-thickness ears, and a handle-bar surmounting the stem and boltably secured to said ears.

7. The structure of claim 6 in which said stiffened part of the fork-piece, sectionally considered, is of a hexagonal form.

8. The rear-end structure for a child's scooter which comprises, in combination: a rear wheel of double-disc construction having the hub of each disc inwardly cupped and centrally apertured, ball-bearing assemblies for each side of the wheel seating by a respective outer ring in said cupped depressions, a frame-piece carried rearwardly along both sides of the wheel and providing transversely-aligned apertures adapted to register with the apertures of the wheel, an axle-bolt having its ends threaded and received through said registering apertures of the wheel and frame-piece, a spacer fitting over the axle-bolt between the inner rings of the two bearing assemblies and bearing by its ends against said inner rings, a U-shaped parking stand arranged to swing about the center of the axle-bolt as an axis and having its two arms each terminally apertured, said apertures being of a diameter exceeding that of the axle-bolt, and cap nuts for the ends of the axle-bolts providing hubs fitting within the last-named apertures to serve as journals for the parking stand, said hubs being of smaller diameter than the heads of the nuts and having a greater length than the thickness of the arms and thus permitting free-swinging movement of the parking stand while being brought firmly to bear against the frame-piece to exert, through the latter, clamping pressure against said inner rings of the bearing assemblies.

9. In a child's scooter employing a frame-piece and a fork, the mounting by which the front end of the frame-piece is suspended from the fork and which comprises vertically spaced cross-bars fixedly associated with the fork and providing vertically aligned apertures, a bushing carried by the front end of the frame-piece to occupy a vertical position, said bushing being formed at each of its two ends with enlarged heads and having the reduced neck between said heads caught by the frame-piece while the enlarged heads bear top and bottom against the frame-piece to immovably secure the bushing to the frame-piece, said bushing being adapted to be inserted between the cross-bars with its bore in alignment with the aligned apertures of the latter, and a swivel-pin arranged to be dropped through said aligned bore and apertures.

10. The structure of claim 9 in which the bushing of sheet-metal construction having each of the end extremities turned back upon itself to produce the enlarged heads by the double thickness of metal thereby obtained.

11. In a child's scooter providing a skirted fender and having aligned apertures in the skirts of the fender, the wheel mounting therefor and which comprises, in combination with the fender, a double-disc wheel housed by the fender and characterized in that each disc is centrally apertured and provides a central recess concentric to the aperture, a ball-bearing assembly for each side of the wheel comprised of an outer and an inner ring with a train of balls confined therebetween and fitted in the related recess to have the outer ring bear against the floor of the recess, an axle-bolt having its ends threaded and received through the inner rings of said ball-bearing assemblies to project through the latter and beyond the fender skirts at each side of the scooter, a spacer fitting over the axle-bolt between the two bearing assemblies and extending freely through the disc apertures to bear by its ends against the inner rings of the two bearing assemblies, and cap nuts for said threaded ends of the axle-bolt arranged to bear against the fender skirts and through the latter exert clamping pressure upon the outer faces of said inner rings of the two bearing assemblies.

GEORGE A. REID.

REFERENCES CITED

The following references are of record in the file of this patent:

UNITED STATES PATENTS

| Number | Name | Date |
| --- | --- | --- |
| D. 91,256 | Van Doren et al. | Dec. 26, 1933 |
| D. 92,386 | Blackmore | June 5, 1934 |
| 1,425,880 | Mack | Aug. 15, 1922 |
| 1,517,808 | Strniste | Dec. 2, 1924 |
| 1,617,337 | Lees | Feb. 15, 1927 |
| 1,931,162 | Kranz et al. | Oct. 17, 1933 |
| 1,933,421 | Elliotte | Oct. 31, 1933 |
| 2,111,691 | Salsbury | Mar. 22, 1938 |
| 2,145,436 | Sullivan | Jan. 31, 1939 |
| 2,177,991 | Maddock | Oct. 31, 1939 |
| 2,225,914 | Lewis et al. | Dec. 24, 1940 |

FOREIGN PATENTS

| Number | Country | Date |
| --- | --- | --- |
| 136,472 | Great Britain | Dec. 8, 1919 |
| 186,206 | Great Britain | Sept. 28, 1922 |